Jan. 11, 1927.
R. P. DEWEY
MILLING CUTTER
Filed Nov. 2, 1921
1,614,288
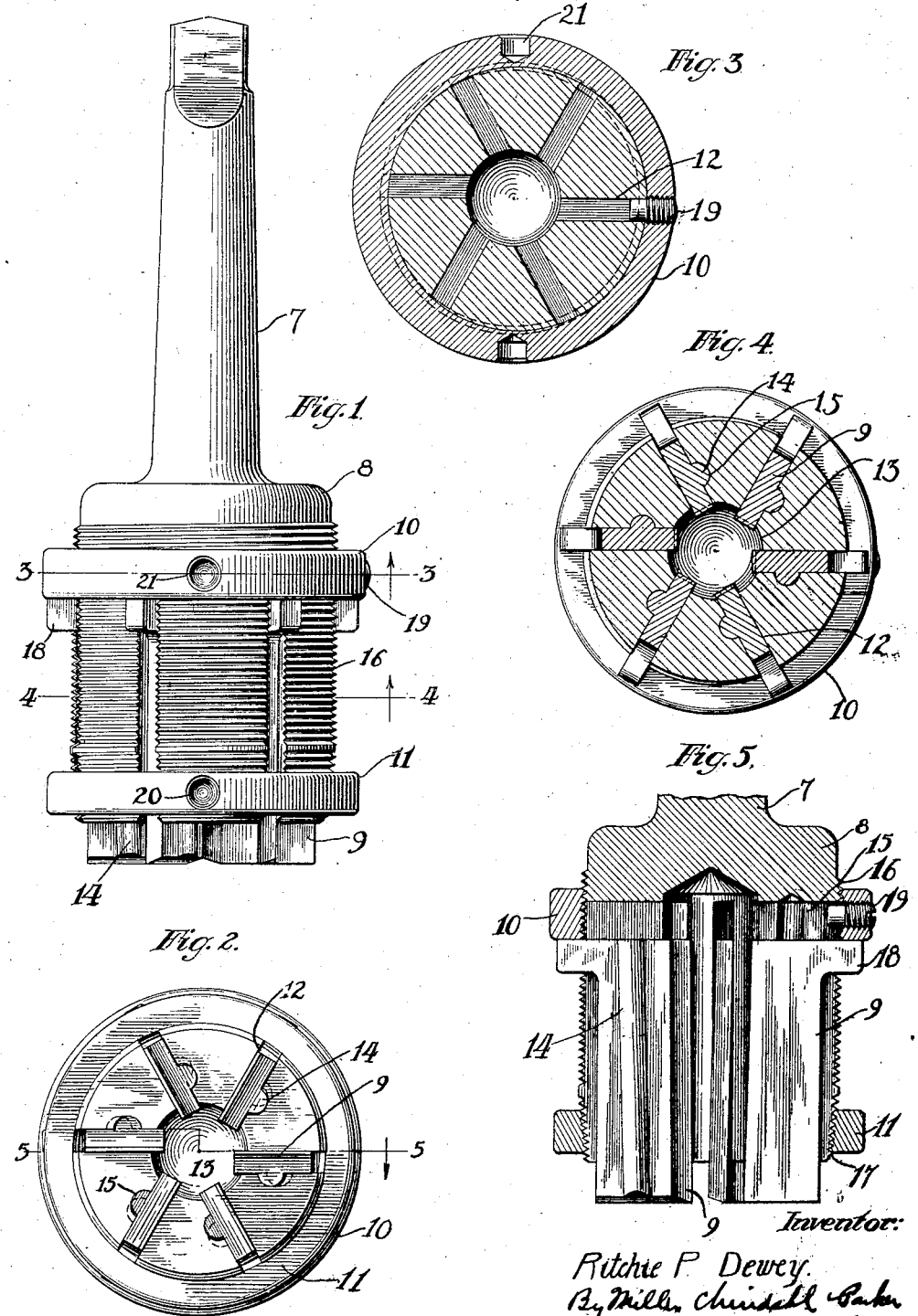
Inventor:
Ritchie P. Dewey.
By Miller, Chadwell, Baker
Att'ys.

Patented Jan. 11, 1927.

1,614,288

UNITED STATES PATENT OFFICE.

RITCHIE P. DEWEY, OF ROCKFORD, ILLINOIS, ASSIGNOR, BY MESNE ASSIGNMENTS, TO BARBER-COLMAN COMPANY, OF ROCKFORD, ILLINOIS, A CORPORATION OF ILLINOIS.

MILLING CUTTER.

Application filed November 2, 1921. Serial No. 512,285.

The invention relates to milling cutters of the type commonly known as hollow mills and end mills; and it has for its aim the provision of a milling cutter of this class which is effectual from an operative standpoint and is at the same time capable of being economically manufactured and used.

With this aim in view, the object of the invention is to produce a milling cutter of the inserted tooth type having blades mounted for adjustment in a cylindrical head or body so that the blades may be resharpened until substantially consumed in use, the construction being such that notwithstanding such adjustment the cutting size or diameter of the tool may be maintained uniform.

A further object is to provide a construction for the tool such as to enable its manufacture on an exceedingly practical basis.

The objects of the invention thus generally stated, together with other and ancillary advantages, are attained by the construction and arrangement illustrated in the accompanying drawings forming part hereof. In such drawings I have shown a cutter of the hollow mill type, but it will be apparent that the invention is not limited to a cutter designed for any specific purpose and that various changes in form, construction and arrangement may be made by those skilled in the art without departing from the spirit and scope of the invention as expressed in the appended claim.

Figure 1 of the drawings is an elevational view of a cutter constructed in accordance with my invention. Fig. 2 is an end view of the same. Fig. 3 is a transverse sectional view taken in the plane of line 3—3 of Fig. 1. Fig. 4 is a similar view taken in the plane of line 4—4 of Fig. 1. Fig. 5 is a fragmentary horizontal section taken in the plane of line 5—5 of Fig. 2.

The cutter comprises generally a shank 7 carrying a cylindrical body or head 8. 9 designates the cutter blades which are mounted for longitudinal adjustment in the head. These blades are moved simultaneously toward the lower end of the head by means of an adjusting collar 10, and the blades are clamped in the desired position of adjustment by means of a locking ring 11.

The head 8 is formed integral with the shank 7 and at spaced intervals about its axis is provided with a plurality (preferably an uneven number) of longitudinal slots 12 for the reception of the blades 9. The body has a central or axial bore 13 therein into which the inner edges of the blades project. For holding said blades against outward movement in the slots 12 and for guiding them in their longitudinal movement, they are provided with ribs 14 upon one side engaging in complementary grooves 15 in the adjacent side walls of the slots. These ribs and grooves, as shown in Figs. 2 and 5, are inclined to a slight extent with reference to the axis of the cutter. Herein they are shown as being inclined inwardly, so that as the blades are moved downwardly in their slots, it will be apparent that they also move inwardly as guided by said ribs and grooves. The inner edges of the blades are tapered or inclined outwardly and upwardly as shown clearly in Fig. 5, at an angle somewhat less than that of the guiding means. By this construction, a clearance is maintained at all times between the work and the edges of the blades adjacent thereto, and a cutting diameter of uniform size may be maintained notwithstanding the adjustment of the blades to compensate for the loss of metal due to frequent re-grinding. It will be noted that the blades are made of substantial length and that the greater portion thereof is capable of use. Thus, the cutter may be used for an exceedingly long time without necessitating the replacement of the blades.

The exterior of the body or head 8 of the cutter is threaded as at 16 for engagement by the internal threads formed upon the adjusting collar or ring 10; and the lower end or nose of the body is tapered and provided with screw threads 17 for engagement by the internally threaded locking ring 11. In order that the adjusting ring may engage with the blades 9 to move them downwardly in their slots, they are provided with portions or ears 18 projecting outwardly beyond the periphery of the body. By reason of the fact that the head is slotted, it is capable of yielding under the action of the locking ring 11 so as to clamp effectively the blades in the desired position of adjustment. The ring 10 is provided with a dowel point screw 19 which is adapted to engage in any one of the slots 12 to maintain the ring in its adjusted position. Each of these rings is preferably provided with suitable apertures 20 in its periphery for the reception of a suitable implement to facilitate the operation thereof.

In the manufacture of my improved cutter, the body is first threaded exteriorly and the rings fitted thereon. A series of holes are then drilled in the nose of the body at equidistantly spaced points and at an angle corresponding to the desired angle of the grooves 15. These holes obviously lie along elements of a cone having its axis in common with the cutter. These holes are of the same radius as that of said groove. In the next operation, the body is bored centrally thereof to render it resilient under the action of the locking ring 11. Finally the slots 12 are cut so that one wall thereof coincides exactly with the diameter of the holes previously drilled. Thus the grooves 15 are formed.

It will be observed that I have provided a construction for milling cutters of the hollow mill type and the end mill type, which is of a very efficient and practical character. The parts are capable of being quickly assembled and disassembled; the blades are readily adjustable by a simple manipulation of the adjusting collar, and are firmly held in position by means of the guiding ribs and grooves and the locking ring 11. The blades are made of substantial length and a substantial portion thereof is capable of use so that the cutter is capable of operation for an exceptionally long time without necessitating a replacement of the blades; and as the ends of the blades become worn and are reduced in size in re-sharpening, the adjustment of the blades to compensate for such decrease in size may be effected without destroying the uniformity of the cutting diameter of the mill. By the construction herein shown the internal cutting diameter is maintained, but it will be obvious that by properly arranging the grooves and shaping the side edges of the blades, the outer cutting diameter may similarly be maintained.

I claim as my invention:

A milling cutter comprising a cylindrical body of substantial length and having an axial bore extending substantially throughout the length thereof, said body being slotted longitudinally and having a plurality of blades inserted therein and having outwardly projecting portions extending beyond the periphery thereof, means for guiding said blades for longitudinal movement, means for moving said blades comprising a ring screw-threaded upon the exterior of the body and adapted to engage with said outwardly projecting portion, said ring having means adapted to engage with said slots to hold it in the desired position of adjustment, and means upon the nose of the body for clamping the blades in their slots.

In testimony whereof, I have hereunto set my hand.

RITCHIE P. DEWEY.